(12) United States Patent
Huang

(10) Patent No.: US 9,547,128 B2
(45) Date of Patent: Jan. 17, 2017

(54) OPTICAL WAVEGUIDE DIRECTIONAL COUPLER AND METHOD FOR MAKING SAME

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/863,457

(22) Filed: Sep. 24, 2015

(65) Prior Publication Data

US 2016/0018597 A1 Jan. 21, 2016

Related U.S. Application Data

(62) Division of application No. 13/686,951, filed on Nov. 28, 2012, now Pat. No. 9,182,547.

(30) Foreign Application Priority Data

Jun. 1, 2012 (TW) .............................. 101119658 A

(51) Int. Cl.
*G02B 6/125* (2006.01)
*G02B 6/136* (2006.01)
*G02B 6/12* (2006.01)
*G02B 6/28* (2006.01)

(52) U.S. Cl.
CPC ............... *G02B 6/136* (2013.01); *G02B 6/125* (2013.01); *G02B 6/2821* (2013.01); *G02B 2006/12176* (2013.01)

(58) Field of Classification Search
CPC .................... G02B 6/125; G02B 6/136; G02B 2006/12176
See application file for complete search history.

(56) References Cited

FOREIGN PATENT DOCUMENTS

CN 1767285 A 5/2006

*Primary Examiner* — Jerry Rahill
(74) *Attorney, Agent, or Firm* — Zhigang Ma

(57) ABSTRACT

An optical waveguide directional coupler includes a base having a planar member and a ridge member and an optical waveguide in the base. The ridge member extends from the planar member and has an upper surface where the optical waveguide exposed. The optical waveguide includes a first flat side surface, a second flat side surface parallel to the first flat side surface, a third flat side surface, a fourth flat side surface parallel to the third flat side surface, and a first flat connection side surface. An included angle θ1 between the first and third flat side surfaces is an obtuse angle, an included acute angle α1 is formed between the first flat connection side surface and the second flat side surface, and θ1 and α1 satisfy α1<(180°−θ1).

3 Claims, 12 Drawing Sheets

OPTICAL WAVEGUIDE DIRECTIONAL COUPLER AND METHOD FOR MAKING SAME

This application is a divisional application of a commonly-assigned application entitled "OPTICAL WAVEGUIDE DIRECTIONAL COUPLER AND METHOD FOR MAKING SAME", filed on Nov. 28, 2012 with application Ser. No. 13/686,951. The disclosure of the above-identified application is incorporated herein by reference.

FIELD

The present disclosure relates to an optical waveguide directional coupler and a method for making the optical waveguide directional coupler.

BACKGROUND

Optical waveguide directional couplers couple light beams of different wavelengths to an optical fiber and divide light from the optical fiber into light beams of different wavelengths.

An optical waveguide directional coupler includes a base and an optical waveguide formed in the base. In order to change the direction of the light beams passing through the optical waveguide, the optical waveguide is designed to be bent with a radius of curvature. However, if the radius of curvature is insufficient, the scatting loss of the light beams increases. If the radius of curvature is excessive, though the scatting loss of the light beams decreases, the length of the optical waveguide increases.

Therefore, it is desirable to provide an optical waveguide directional coupler and a method for making same, which can overcome or alleviate the above-mention problems.

DETAILED DESCRIPTION

Figure 1:
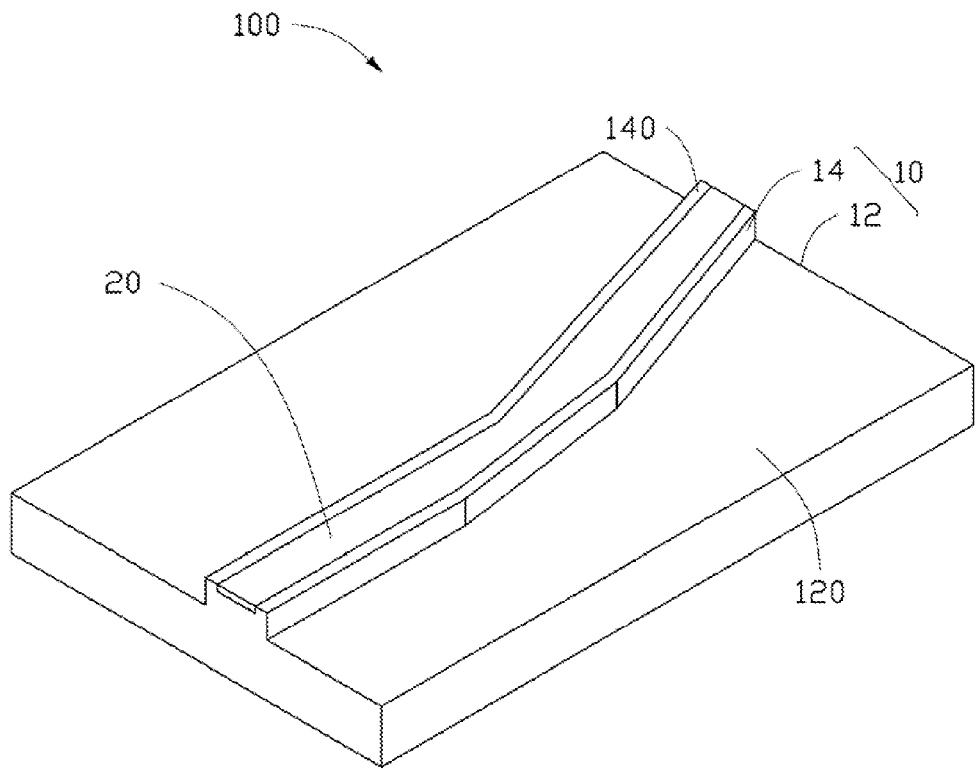
FIG. 1 is a schematic, isometric view of an optical waveguide directional coupler including an optical waveguide, according to a first exemplary embodiment.

FIG. 1 shows a first exemplary embodiment of an optical waveguide directional coupler 100. The optical waveguide directional coupler 100 is rigid-typed and includes a base 10 and an optical waveguide 20 formed in the base 10.

The base 10 includes a planar member 12 and a raised elongated ridge member 14. The planar member 12 is a plate and includes a planar top surface 120. The ridge member 14 upwardly and perpendicularly extends from the top surface 120 and includes a planar upper surface 140.

The optical waveguide 20 is embedded in the ridge member 14 and exposed at the upper surface 140. The optical waveguide 20 extends through the ridge member 14 along a lengthwise direction of the ridge member 14. Distal ends of the optical waveguide 20 are exposed at opposite end surfaces of the ridge member 14. In this embodiment, the optical waveguide 20 is made of a material selected from a group consisting of titanium, zinc and nickel.

Figure 2:
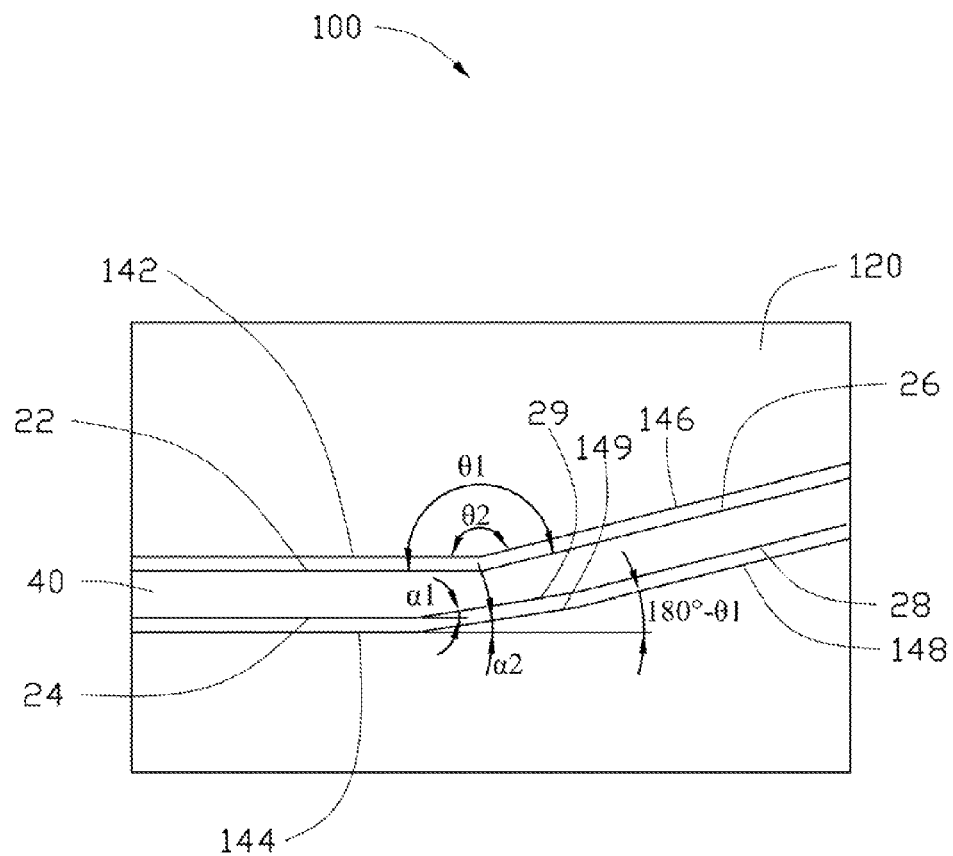
FIG. 2 is a planar view of the optical waveguide directional coupler of FIG. 1.

Referring to FIG. 2, the optical waveguide 20 includes a first flat side surface 22, a second flat side surface 24, a third flat side surface 26, a fourth flat side surface 28, and a first flat connection side surface 29. The first flat side surface 22 is parallel to and opposite to the second flat side surface 24. The third flat side surface 26 is parallel to the fourth flat side surface 28. The first flat side surface 22 directly connects the third flat side surface 26, and an included angle $\theta 1$ between the first flat side surface 22 and the third flat side surface 26 is an obtuse angle. The first flat connection side surface 29 interconnects the second flat side surface 24 and the fourth flat side surface 28, and an included acute angle $\alpha 1$ is formed between a main plane of the first flat connection side surface 29 and a main plane of the second flat side surface 24. The included angle $\theta 1$ and the included angle $\alpha 1$ satisfy the following formula: $\alpha 1 < (180° - \theta 1)$.

Figure 3:
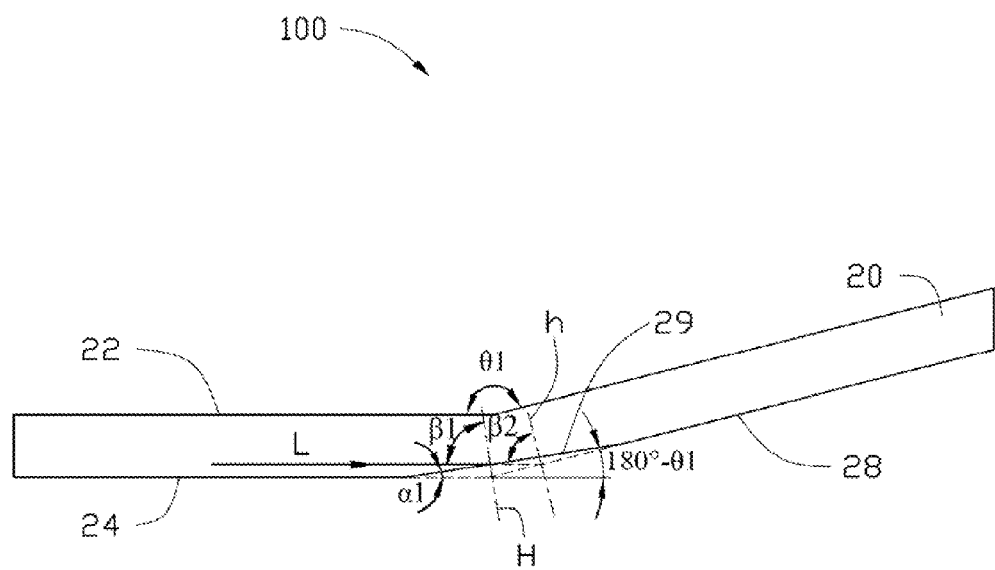
FIG. 3 is a schematic view of a light path of the optical waveguide of FIG. 1.

Referring to FIG. 3, when in use, a light beam L parallel to the first flat side surface 22 enters the optical waveguide 20, and is reflected by the first flat connection side surface 29, and then transmits ahead, and finally emits from the optical waveguide 20. When the light beam L impinges on the first flat connection side surface 29, the incident angle of the light beam L is $\beta 1$. If the first flat connection side surface 29 is omitted, and the second flat side surface 24 directly connects the fourth flat side surface 28 (the dash lines show), the light beam L will impinge on the fourth flat side surface 28, and the incident angle of the light beam L is $\beta 2$. Wherein $\beta 1 = 90° - \alpha 1$, $\beta 2 = 90° - (180° - \theta 1)$, and $\beta 1 - \beta 2 = 90° - \alpha 1 - 90° + (180° - \theta 1) = 180° - \theta 1 - \alpha 1$, as a result, $\beta 1 - \beta 2 > 0$ due to formula $\alpha 1 < (180° - \theta 1)$. Thus, the incident angle $\beta 1$ of the light beam L impinging on the first flat connection side surface 29 is bigger than the incident angle $\beta 2$ of the light beam L impinging on the fourth flat side surface 28, and more light beams entering the optical waveguide 20 are totally reflected by the first flat connection side surface 29. Therefore, the scatting loss of the light beams is reduced, and increasing the length of the optical waveguide 20 is avoided.

In this embodiment, in order to further reduce the scatting loss of the light beams, the shape of the ridge member 14 conforms to that of the optical waveguide 20. In detail, referring to FIG. 2, the ridge member 14 includes a first sidewall 142, a second sidewall 144, a third sidewall 146, a fourth sidewall 148, and a first connection sidewall 149. The first sidewall 142 is parallel to the second sidewall 144 and the first flat side surface 22. The third sidewall 146 is parallel to the fourth sidewall 148 and the third flat side surface 26. The first sidewall 142 directly connects the third sidewall 146, and an included angle $\theta 2$ between the first sidewall 142 and the third sidewall 146 is an obtuse angle. The first connection sidewall 129 is parallel to the first flat connection side surface 29 and interconnects the second sidewall 144 and the fourth sidewall 148, and an acute included angle $\alpha 2$ is formed between a main plane of the first connection sidewall 149 and a main plane of the second sidewall 144. The included angle $\theta 2$ is equal to the included angle $\theta 1$, and the included angle $\alpha 2$ is equal to the included angle $\alpha 1$. Therefore, the included angle $\theta 2$ and the included angle $\alpha 2$ satisfy the following formula: $\alpha 2 < (180° - \theta 2)$.

Figure 4:
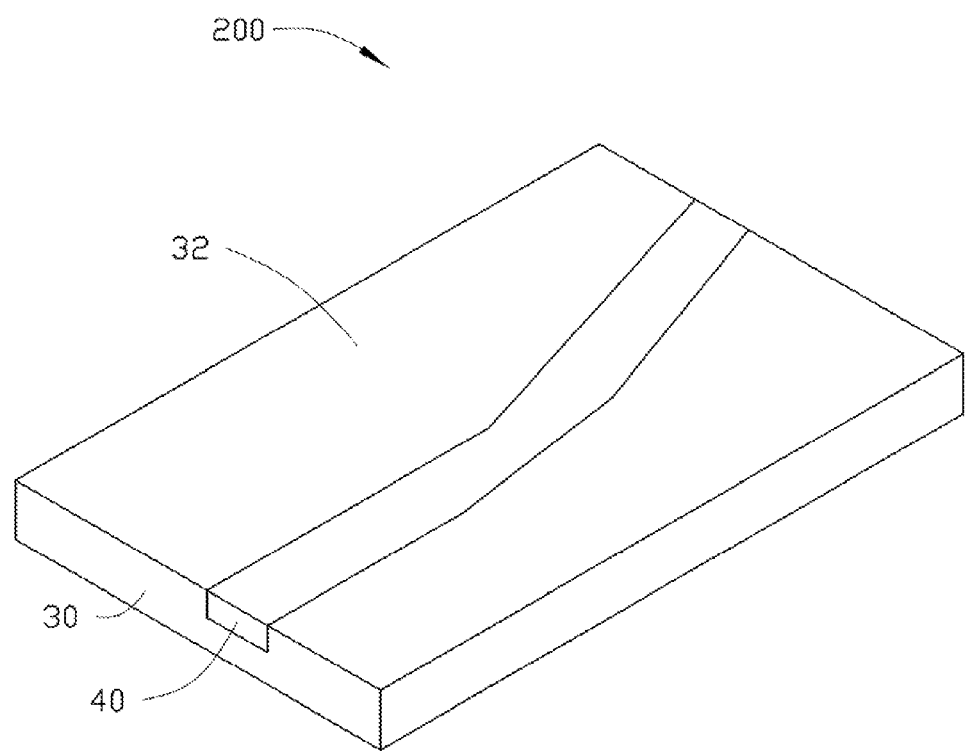
FIG. 4 is a schematic, isometric view of an optical waveguide directional coupler, according to a second exemplary embodiment.

Referring to FIG. 4, an optical waveguide directional coupler 200, according to a second exemplary embodiment, is shown. The difference between the optical waveguide directional coupler 200 of this embodiment and the optical waveguide directional coupler 100 of the first embodiment is that the optical waveguide directional coupler 200 is planar-typed. The base 30 is a planar plate and the ridge member 14 is omitted. The base 30 includes a first surface 32. The optical waveguide 40 is embedded in the base 30 and is exposed at the first surface 32. One end of the optical waveguide 40 is exposed at an end surface of the base 30, and the other end of the optical waveguide 40 is exposed at the other end surface of the base 30.

Figure 5:
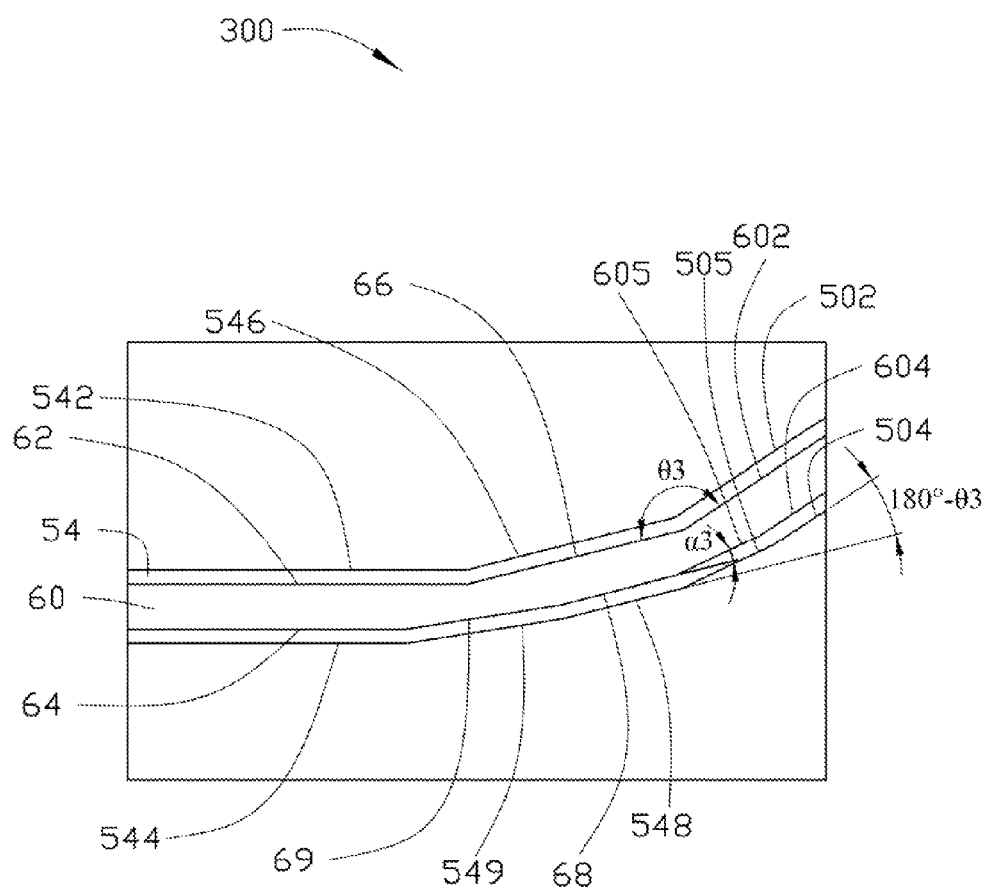
FIG. 5 is a planar view of an optical waveguide directional coupler, according to a third exemplary embodiment.

Referring to FIG. 5, an optical waveguide directional coupler 300, according to a third exemplary embodiment, is shown. The differences between the optical waveguide directional coupler 300 of this embodiment and the optical waveguide directional coupler 100 of the first embodiment are that the optical waveguide 60 further includes a fifth flat side surface 602, a sixth flat side surface 604, and a second flat connection side surface 605. The first flat side surface 62, the third flat side surface 66, and the fifth flat side surface 602 are connected in sequence. The second flat side surface 64, the first flat connection side surface 69, the fourth flat side surface 68, the second flat connection side surface 605, and the sixth flat side surface 604 are connected in sequence. In detail, the fifth flat side surface 602 is parallel to the sixth flat side surface 604. The fifth flat side surface 602 directly connects the third flat side surface 66, and an included angle θ3 between the third flat side surface 66 and the fifth flat side surface 602 is an obtuse angle. The second flat connection side surface 605 interconnects the fourth flat side surface 68 and the sixth flat side surface 604, and an acute included angle α3 is formed between the second flat connection side surface 605 and the fourth flat side surface 68. The included angle θ3 and the included angle α3 satisfy the following formula: α3<(180°−θ3). In this embodiment, the included angle θ3 is equal to the included angle θ1 (see FIG. 2), and the included angle α3 is equal to the included angle α1 (see FIG. 2). In other embodiment, the included angle θ3 may be not equal to the included angle θ3, and the included angle α3 may be not equal to the included angle α1.

The shape of the ridge member 54 conforms to the shape of the optical waveguide 60. In detail, the ridge member 54 further includes a fifth sidewall 502, a sixth sidewall 504, and a second connection sidewall 505. The fifth sidewall 502 adjoins the third sidewall 546. That is, the first sidewall 542, the third sidewall 546, and the fifth sidewall 502 are connected in sequence. The second connection sidewall 505 is interconnected between the fourth sidewall 548 and the sixth sidewall 504. That is, the second sidewall 544, the first connection sidewall 549, the fourth sidewall 548, the second connection sidewall 505, and the sixth sidewall 504 are connected in sequence. The fifth sidewall 502 is parallel to the fifth flat side surface 602. The sixth sidewall 504 is parallel to the sixth flat side surface 604. The second connection sidewall 505 is parallel to the second flat connection side surface 605.

Advantages of the optical waveguide directional coupler 200 of the second embodiment and the optical waveguide directional coupler 300 of the third embodiment are similar to those of the optical waveguide directional coupler 100 of the first embodiment. The optical waveguide directional coupler 300 can further reduce the scattering loss of light because the optical waveguide directional coupler 300 further includes the fifth flat side surface 602, the sixth flat side surface 604, and the second flat connection side surface 605.

Referring to FIGS. 6-10, a method for making the optical waveguide directional coupler 100, according to a fourth exemplary embodiment, is shown. The method includes the following steps.

Figure 6:
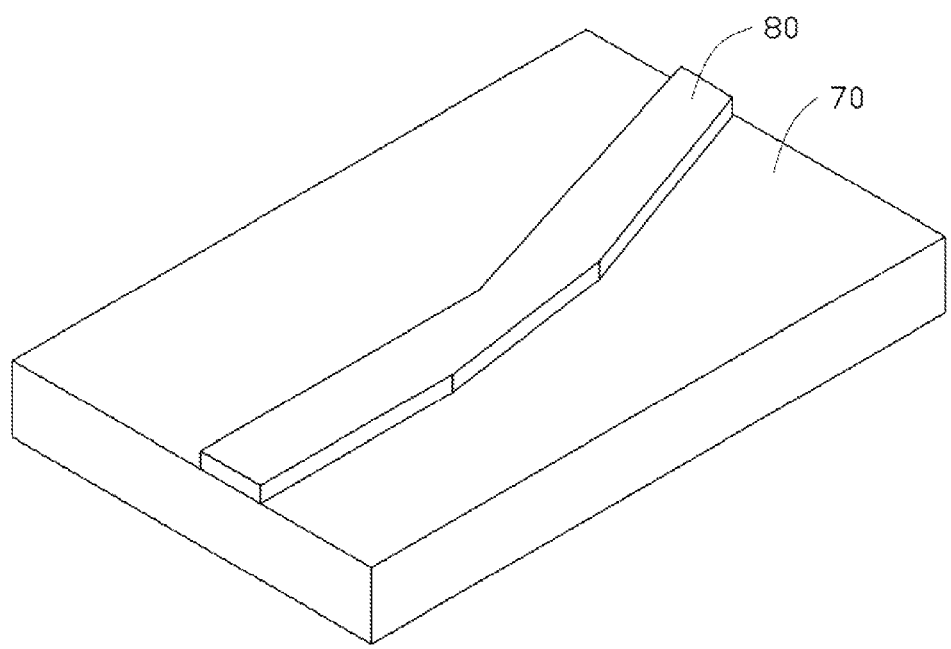
FIGS. 6-12 show steps of a method for making the optical waveguide directional coupler of FIG. 1, according to a fourth exemplary embodiment.

First, referring to FIG. 6, a substrate 70 and a first mask 80 are provided. Specifically, the substrate 70 is a planar plate. The first mask 80 has a shape conforming to the ridge member 14 of the first embodiment. In this embodiment, the substrate 70 is made of a material selected from a group consisting of lithium niobate and barium niobate.

Figure 7:
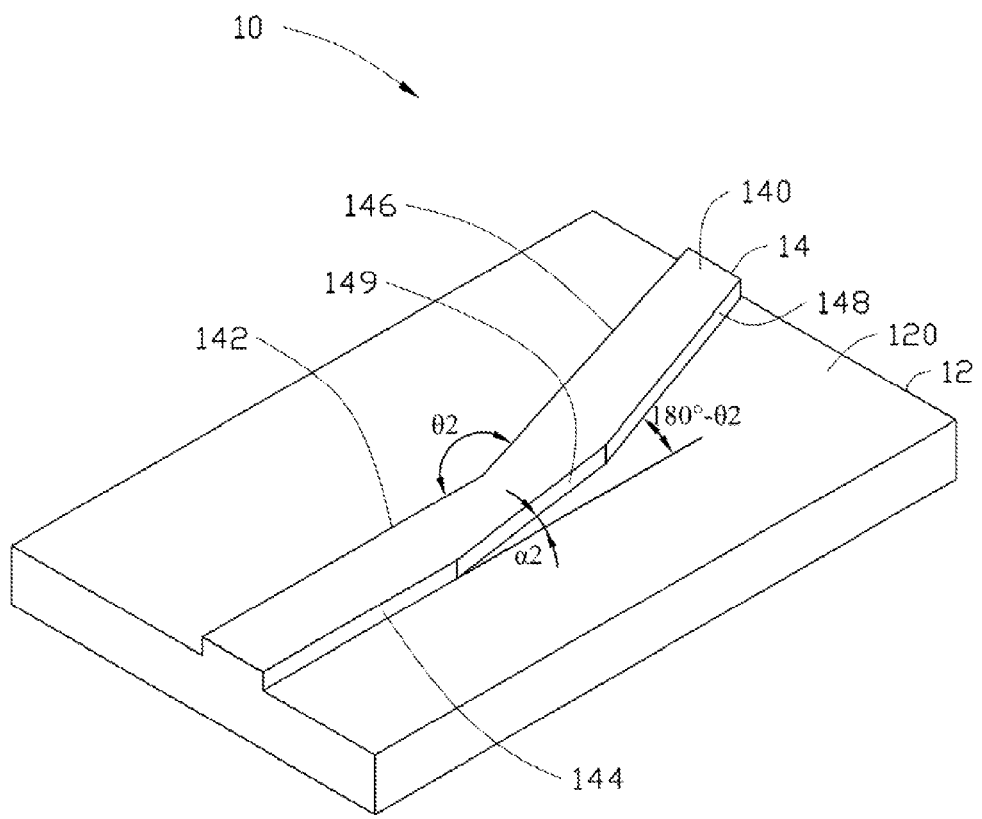

Second, referring to FIG. 7, a base 10 is obtained by etching the substrate 70 to remove portions of the substrate 70 to obtain the base 10 using the first mask 80. In detail, the substrate 70 of 3-4 μm thickness uncovered by the first mask 80 is removed. The base 10 includes a planar member 12 and a raised elongated ridge member 14. The planar member 12 is a plate and includes a planar top surface 120. The ridge member 14 extends from the top surface 120 and includes a planar upper surface 140. The ridge member 14 includes a first sidewall 142, a second sidewall 144, a third sidewall 146, a fourth sidewall 148, and a first connection sidewall 149. The first sidewall 142 is parallel to the second sidewall 144. The third sidewall 146 is parallel to the fourth sidewall 148. The first sidewall 142 directly connects the third sidewall 146, and an included angle θ2 between the first sidewall 142 and the third sidewall 146 is an obtuse angle. The first connection sidewall 129 interconnects the second sidewall 144 and the fourth sidewall 148, and an acute included angle α2 is formed between a main plane of the first connection sidewall 149 and a main plane of the second sidewall 144. The included angle θ2 and the included angle α2 satisfy the following formula: α2<(180°−θ2). To increase the etching speed, the etching solution is composed of HF and $HNO_3$ having a molar ratio of 1:2.

Figure 8:
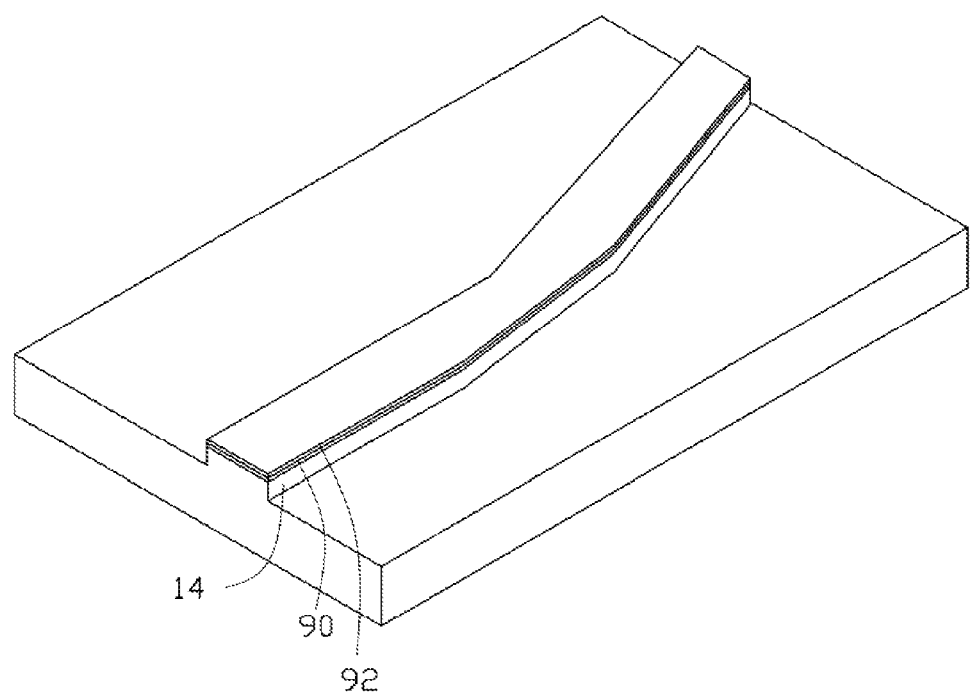

Third, referring to FIG. 8, a light guiding layer 90 is formed on the entire upper surface 140. The light guiding layer 90 includes a central portion and lateral unwanted portions at opposite sides of the central portion. In this embodiment, the light guiding layer 90 is made of a material selected from a group consisting of titanium, zinc and nickel, and the thickness of the light guiding layer 40 is in a range from 0.6 μm to 0.8 μm.

Fourth, referring to FIG. 8, a photo-resist layer 92 is formed on the entire light guiding layer 90.

Figure 9:
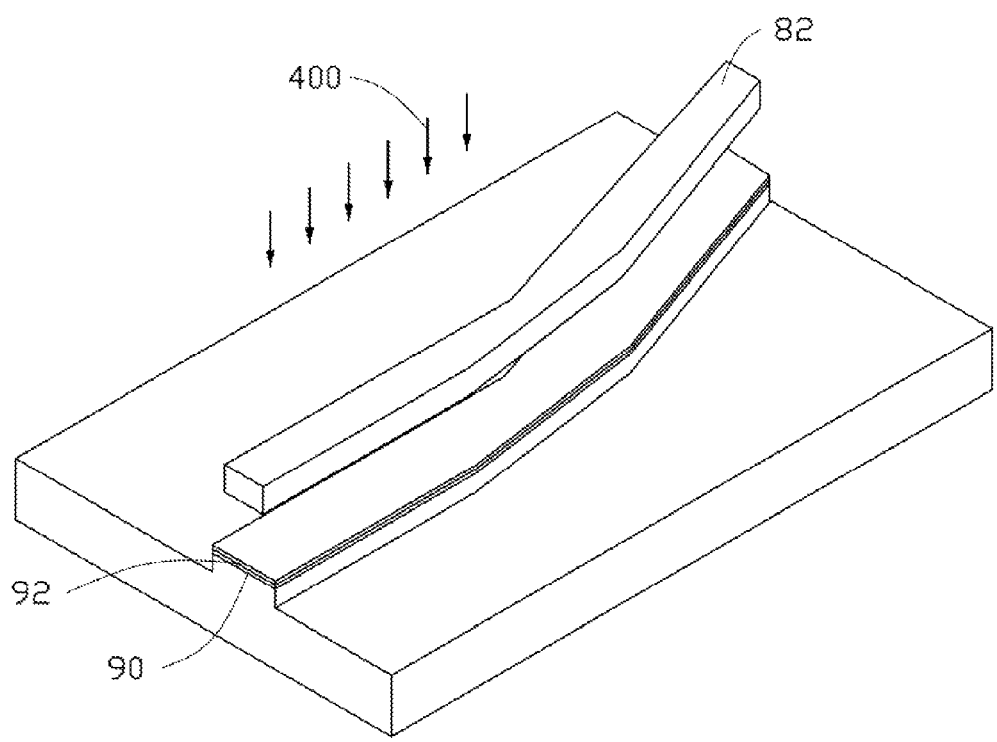
Figure 10:
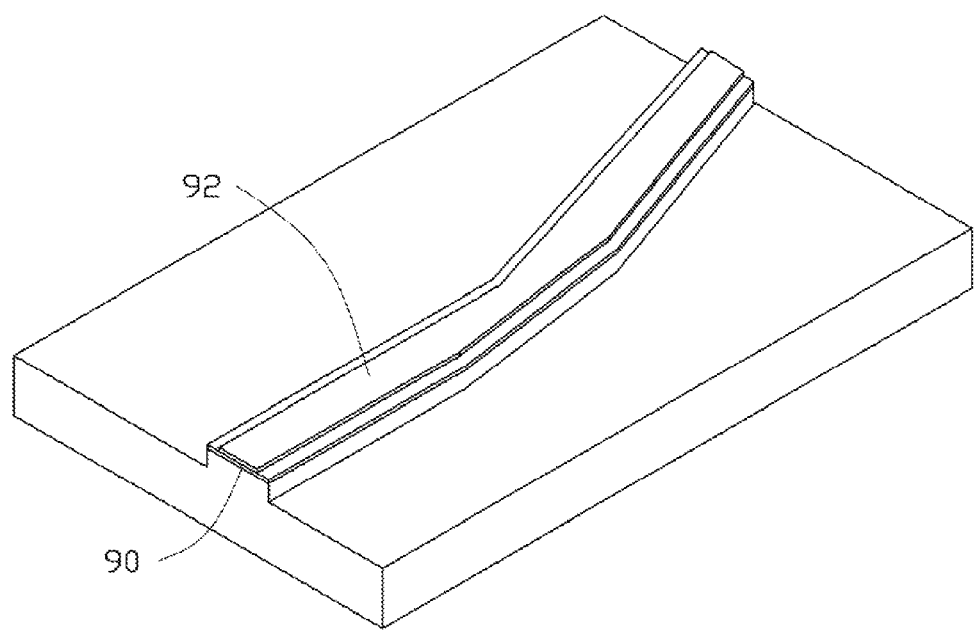

Fifth, referring to FIG. 9-10, a photo-resist layer 92 is processed so as to remove portions thereof to expose the lateral unwanted portions. In detail, a second mask 82 having a shape conforming to the optical waveguide 20 is placed over the photo-resist layer 92. Then, the photo-resist layer 92 is exposed at light beams 400 using the second mask 82. The photo-resist layer 92 is developed, thereby obtaining a photo-resist layer 92 having a shape conforming to the optical waveguide 20 on the light guiding layer 90

Sixth, referring to FIGS. 9-10, the light guiding layer 90 is etched to remove the lateral unwanted portions. That is, the light guiding layer 90 has a shape conforming to the optical waveguide 20.

Seventh, the processed photo-resist layer 92 is removed.

Figure 11:
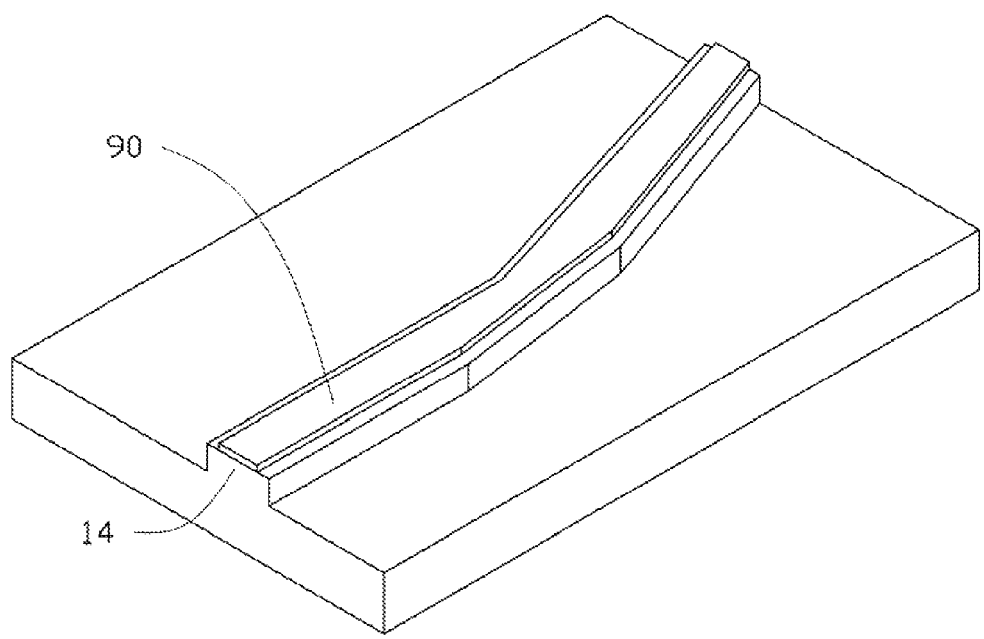
Figure 12:
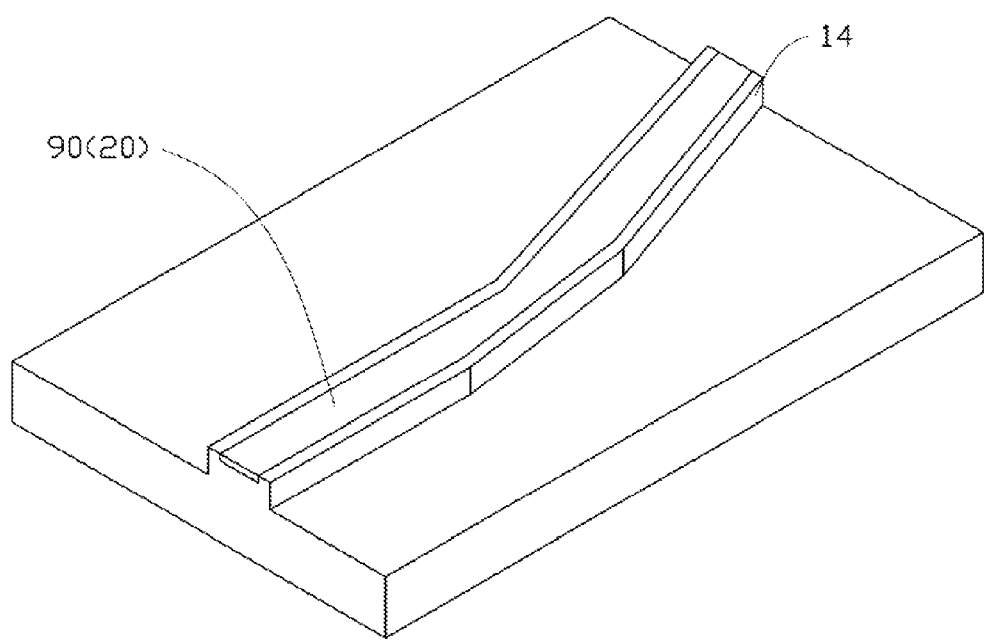

Eighth, referring to FIGS. 11-12, the base 10 and the etched light guiding layer 90 are heated to diffuse the etched light guiding layer 90 into the base 10, thereby the optical waveguide directional coupler 100 with the optical waveguide 20 (shown in FIG. 1) is achieved.

The method for making the optical waveguide directional coupler 100 can achieve an optical waveguide directional coupler 100 with a reduced light scattering loss.

It is to be understood that methods for making the optical waveguide directional couplers 200 and 300 can refer to the method for making the optical waveguide directional coupler 100.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A method for making an optical waveguide directional coupler, the optical waveguide directional coupler having an optical waveguide, the method comprising:
   providing a base, the base comprising a planar member and a raised elongated ridge member, the ridge member extending upwardly from the planar member and having a planar upper surface;
   forming a light guiding layer on the entire upper surface, the light guiding layer including a central portion and lateral unwanted portions at opposite sides of the central portion;
   forming a photo-resist layer on the entire light guiding layer;
   processing the photo-resist layer so as to remove portions thereof to expose the lateral unwanted portions;
   etching the light guide layer to remove the lateral unwanted portions;
   removing the processed photo-resist layer; and
   heating the base and the etched light guiding layer to diffuse the etched light guiding layer into the base, thereby forming an optical waveguide directional coupler with an optical waveguide.

2. The method as claimed in claim 1, wherein the step of providing the base comprises:
   providing a substrate and a first mask having a shape conforming to the ridge member; and
   etching the substrate to remove portions of the substrate to obtain the base using the first mask.

3. The method as claimed in claim 1, wherein the step of forming processed photo-resist layer comprises:
   placing a second mask having a shape conforming to the optical waveguide over the photo-resist layer;
   exposing the photo-resist layer using the second mask; and
   developing the photo-resist layer.

* * * * *